(12) United States Patent
Hecht et al.

(10) Patent No.: US 7,377,730 B2
(45) Date of Patent: May 27, 2008

(54) DRILL WITH RELEASABLY MOUNTED CUTTING HEAD

(75) Inventors: Gil Hecht, Nahariya (IL); Danny Chen, Nahariya (IL)

(73) Assignee: Iscar Ltd., Tefen (IL)

( * ) Notice: Subject to any disclaimer, the term of this patent is extended or adjusted under 35 U.S.C. 154(b) by 608 days.

(21) Appl. No.: 11/132,401

(22) Filed: May 19, 2005

(65) Prior Publication Data

US 2005/0260046 A1   Nov. 24, 2005

(30) Foreign Application Priority Data

May 24, 2004  (IL) ..................................... 162147

(51) Int. Cl.
B23B 51/02 (2006.01)

(52) U.S. Cl. ...................... 408/231; 408/226; 408/713; 408/1 R

(58) Field of Classification Search ................ 408/1 R, 408/226, 144, 227, 230, 231–233, 713; B23B 51/00, B23B 51/02
See application file for complete search history.

(56) References Cited

U.S. PATENT DOCUMENTS

| | | | |
|---|---|---|---|
| 3,548,688 A | * | 12/1970 | Kuch .......................... 408/230 |
| 5,957,631 A | | 9/1999 | Hecht |
| 5,988,953 A | * | 11/1999 | Berglund et al. ........... 408/1 R |
| 6,109,841 A | | 8/2000 | Johne |
| 6,276,879 B1 | | 8/2001 | Hecht |
| 6,485,235 B1 | | 11/2002 | Mast et al. |
| 6,506,003 B1 | | 1/2003 | Erickson |
| 6,530,728 B2 | | 3/2003 | Eriksson |
| 6,551,035 B1 | | 4/2003 | Bruhn et al. |
| 6,582,164 B1 | | 6/2003 | McCormick |
| 6,695,551 B2 | | 2/2004 | Silver |
| 6,716,388 B2 | | 4/2004 | Bruhn et al. |
| 6,840,717 B2 | | 1/2005 | Eriksson |
| 6,899,495 B2 | | 5/2005 | Hansson et al. |
| 7,048,480 B2 | | 5/2006 | Borschert et al. |
| 7,070,367 B2 | | 7/2006 | Krenzer |
| 7,101,125 B2 | | 9/2006 | Borschert et al. |
| 2003/0039523 A1 | | 2/2003 | Kemmer |
| 2006/0051172 A1 | | 3/2006 | Johnson et al. |

FOREIGN PATENT DOCUMENTS

| | | | |
|---|---|---|---|
| GB | 1395855 | | 5/1975 |
| JP | 2002113606 A | * | 4/2002 |
| JP | 2003291012 A | * | 10/2003 |
| JP | 2003291013 A | * | 10/2003 |
| JP | 2003291019 A | * | 10/2003 |

OTHER PUBLICATIONS

Search Report, PCT/IL2005/000483 dated Sep. 20, 2005.

* cited by examiner

*Primary Examiner*—Daniel W Howell
(74) *Attorney, Agent, or Firm*—Womble Carlyle

(57) ABSTRACT

A drill in which a cutting head is releasably mounted on a tool shank. The cutting head is axially supported by the tool shank at four spaced apart axial support regions on shank support surfaces.

28 Claims, 4 Drawing Sheets

DRILL WITH RELEASABLY MOUNTED CUTTING HEAD

FIELD OF THE INVENTION

The current invention relates to a rotary cutting tool in general and a drill in particular having a releasably mounted cutting head.

BACKGROUND OF THE INVENTION

Such a rotary cutting tool is disclosed in U.S. Pat. No. 5,957,631. The cutting tool comprises a cutting head and tool shank each having two coupling portions and two chip flutes defined therebetween. Each coupling portion of the cutting head and tool shank has a stepped configuration with a raised base surface adjacent one flute and a lowered base surface adjacent the other flute. If the cutting head and tool shank are designed to be coupled together with both the raised and lowered base surfaces in contact, then these surfaces have to be manufactured such that the distance between them is the same to within a high degree of accuracy. If on the other hand, the cutting head and tool shank are designed to be coupled together with only one of the raised and lowered base surfaces in contact, then the coupling will be less stable.

SUMMARY OF THE INVENTION

In accordance with the present invention there is provided a drill comprising a cutting head releasably mounted on a forward end of a tool shank, having a common axis of rotation defining a direction of rotation, the cutting head comprising a cap portion and a fixation portion, the cap portion comprising a head surface, a head base surface and a peripheral side surface extending therebetween, the head base surface being transverse to the axis of rotation, the fixation portion protruding rearwardly from the head base surface away from the head surface and comprising a head fixation surface extending circumferentially relative to the axis of rotation;

at least two head flutes extending along a periphery of the cap and fixation portions forming identical head segments between adjacent pairs of head flutes, each head segment comprising a cap recess opening out to the side surface and the head base surface and dividing the head base surface into first and second head base surfaces, a head torque transmission wall extending along a portion of the cap recess transverse to the head base surface and generally facing opposite the direction of rotation, a head fixation recess dividing the head fixation surface into first and second head fixation surfaces;

at least two shank flutes extend along a periphery of the tool shank forming identical shank coupling portions between adjacent pairs of shank flutes, at the forward end of the tool shank, each shank coupling portion comprising a forwardly facing shank support surface and a shank fixation surface located axially rearwardly relative to the shank support surface, a shank fixation recess divides the shank fixation surface into first and second shank fixation surfaces;

a protuberance protrudes forwardly from each shank support surface, the protuberance dividing the shank support surface into first and second shank support surfaces, a shank torque transmission wall extending along a portion of the protuberance transverse to the shank support surface and generally facing the direction of rotation;

wherein pairs of head segments and shank coupling portions are in mating relationship, and wherein for each such pair the first head base surface abuts the first shank support surface, the second head base surface abuts the second shank support surface, the head torque transmission wall abuts the shank torque transmission wall, the first head fixation surface abuts the first shank fixation surface and the second head fixation surface abuts the second shank fixation surface.

Generally, the cap recess has a recess forward surface and the protuberance has a protuberance forward surface, and there is a gap between the recess forward surface and the protuberance forward surface.

If desired, the recess forward surface is generally parallel to the head base surface and the protuberance forward surface is generally parallel to the shank support surface.

Preferably, the head fixation surface extends rearwardly away from the head base surface and outwardly away from the axis of rotation at a first cone angle $\beta 1$, and the shank fixation surface extends rearwardly away from the shank support surface and outwardly away from the axis of rotation at a second cone angle $\beta 2$.

If desired, the first cone angle $\beta 1$ is smaller than the second cone angle $\beta 2$.

Typically, the at least two head flutes and at least two shank flutes extend in a general axial direction.

If desired, the at least two head flutes are identical and the at least two shank flutes are identical.

If desired, the drill is provided with coolant channels.

In accordance with the present invention there is also provided a method for assembling a drill comprising the steps of:

providing a cutting head comprising a cap portion and a fixation portion, the cap portion comprising a head surface, a head base surface and a peripheral side surface extending therebetween, the head base surface being transverse to an axis of rotation, the fixation portion protruding rearwardly from the head base surface away from the head surface and comprising a head fixation surface extending circumferentially relative to the axis of rotation, at least two head flutes extending along a periphery of the cap and fixation portions forming identical head segments between adjacent pairs of head flutes, each head segment comprising a cap recess opening out to the side surface and the head base surface and dividing the head base surface into first and second head base surfaces, a head torque transmission wall extending along a portion of the cap recess transverse to the head base surface and generally facing a counter direction of rotation, a head fixation recess dividing the head fixation surface into first and second head fixation surfaces, providing a tool shank with at least two shank flutes extending along a periphery of the tool shank forming identical shank coupling portions between adjacent pairs of shank flutes at the forward end of the tool shank, each shank coupling portion comprising a forwardly facing shank support surface and a shank fixation surface located axially rearwardly relative to the shank support surface, a shank fixation recess divides the shank fixation surface into first and second shank fixation surfaces, a protuberance protruding forwardly from each shank support surface, the protuberance dividing the shank support surface into first and second shank support surfaces, a shank torque transmission wall extending along a portion of the protuberance transverse to the shank support surface and generally facing the direction of rotation;

axially aligning the cutting head and tool shank until pairs of head segments and shank coupling portions are opposite each other such that for each pair the first head fixation surface is above the shank fixation recess, the first head base surface is above the first shank support surface and the cap recess is above the protuberance;

for each pair, inserting the first head fixation surface into the shank fixation recess, and the protuberance into the cap recess; and rotating the cutting head until, for each pair, the head torque transmission wall abuts the shank torque transmission wall.

In accordance with another aspect, the present invention is directed to a metal drill cutting head. The drill cutting head has an axis of rotation and a direction of rotation, and comprises: a cap portion comprising a head surface, a head base surface, and a peripheral side surface extending between the head surface and the head base surface; a fixation portion protruding rearwardly from the head base surface away from the head surface and comprising a head fixation surface; and at least two head flutes extending along the cutting head and forming a pair of head segments between adjacent pairs of head flutes, each head segment comprising: a cap recess opening out to the peripheral side surface and the head base surface, the cap recess dividing the head base surface into spaced apart first and second head base surfaces, and a head torque transmission wall extending along a portion of the cap recess transverse to the head base surface, the head torque transmission wall generally facing opposite the direction of rotation.

In accordance with yet another aspect, the present invention is directed to a metal drill having the aforementioned metal drill cutting head and a tool shank. The tool shank has a forward end portion, at least two shank flutes extending along a periphery of the forward end portion and forming a pair of shank coupling portions between adjacent pairs of shank flutes, each shank coupling portion comprising: a forwardly facing shank support surface; a protuberance protruding forwardly from each shank support surface and dividing the shank support surface into first and second shank support surfaces; and a shank torque transmission wall extending along a portion of the protuberance transverse to the shank support surface and generally facing the direction of rotation. The cutting head is releasably mounted on the forward end of the tool shank with pairs of head segments and shank coupling portions in mating relationship, and for each such pair the first head base surface abuts the first shank support surface, the second head base surface abuts the second shank support surface, and the head torque transmission wall abuts the shank torque transmission wall.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
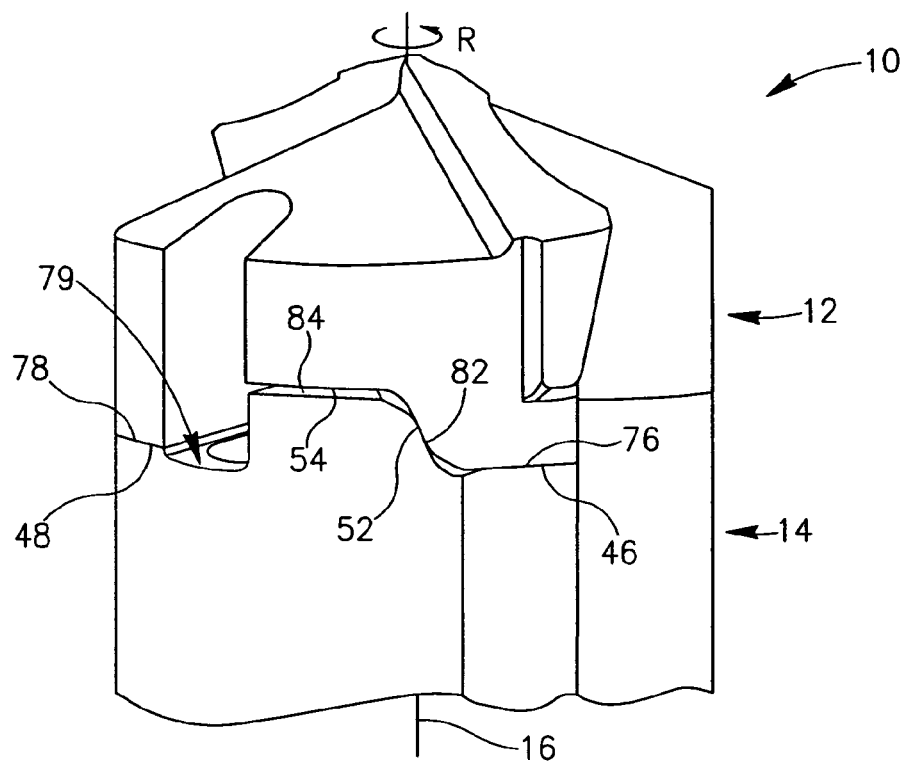
FIG. 1 is a perspective view of a drill in accordance with the present invention.

Attention is drawn to the figures showing a drill 10 (FIG. 1) for drilling holes in metal work pieces. The drill 10 comprises a cutting head 12 releasably mounted on a forward end of a tool shank 14, having a common longitudinal axis of rotation 16 defining a direction of rotation R. The cutting head 12 is typically made of hard wear resistant material such as cemented carbide, and the tool shank 14 is typically made of steel.

Figure 2:
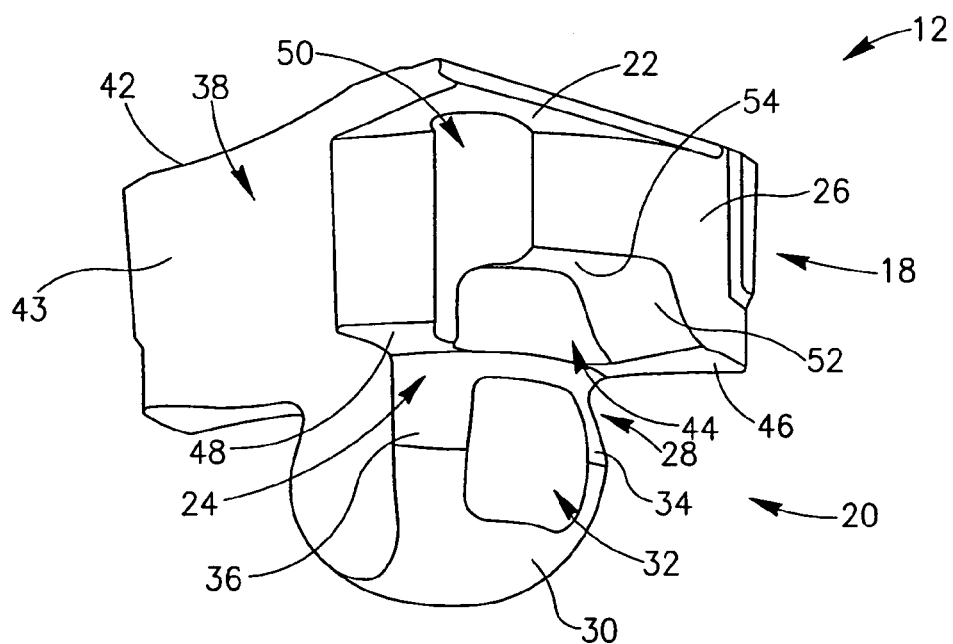
FIG. 2 is a perspective view of a cutting head in accordance with the present invention.
Figure 7:
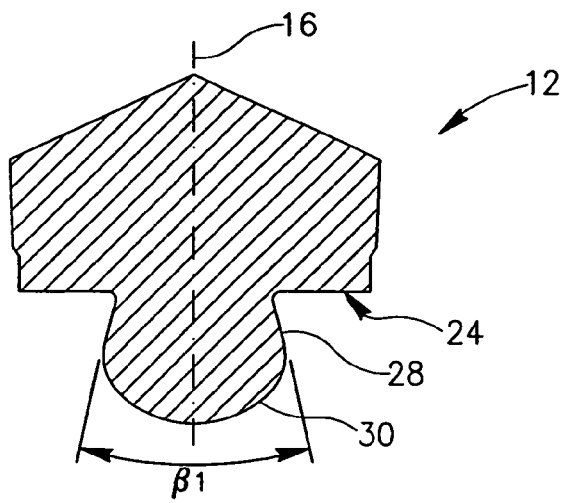
FIG. 7 is a cross sectional view of the cutting head taken along the line VII-VII in FIG. 3.

The cutting head 12 (FIG. 2) comprises a cap portion 18 and a fixation portion 20. The cap portion 18 comprises a head surface 22, a head base surface 24 transverse to the axis of rotation 16 and a peripheral side surface 26 extending therebetween. The fixation portion 20 protrudes rearwardly from the head base surface 24 away from the head surface 22 and has a head fixation surface 28 that extends circumferentially relative to the axis of rotation 16. The head fixation surface 28 (FIG. 7) extends rearwardly away from the head base surface 24 and outwardly away from the axis of rotation 16 at a first cone angle $\beta 1$ to a convex shaped rear fixation surface 30. A head fixation recess 32 (FIG. 2) divides the head fixation surface 28 into a first head fixation surface 34 at a leading end and a second head fixation surface 36 at a trailing end thereof. Leading and trailing ends being defined relative to the direction of rotation R.

Figure 3:
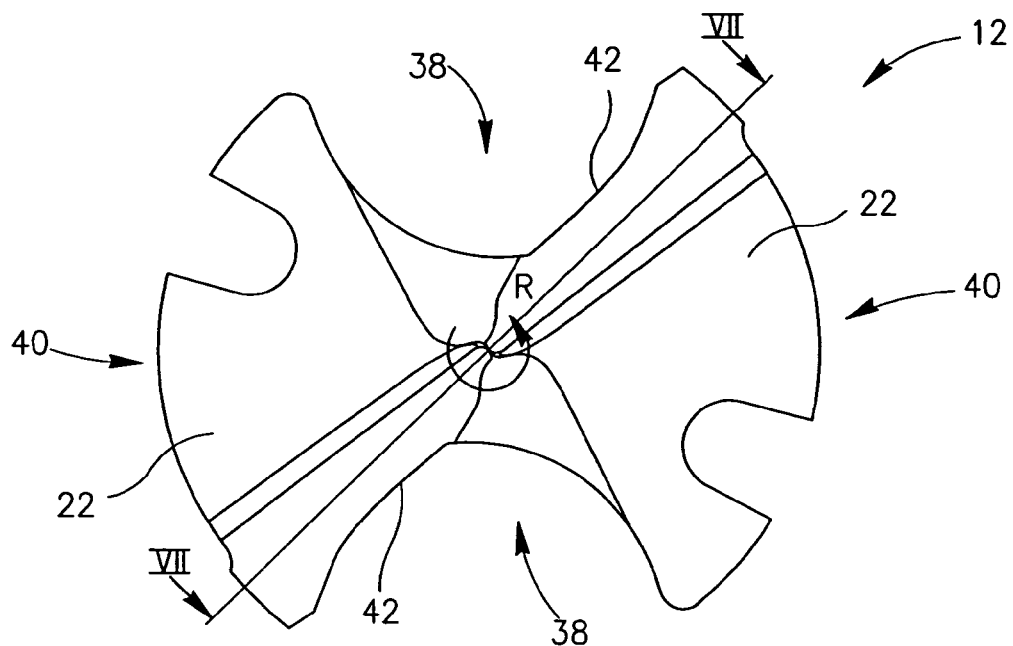
FIG. 3 is a top view of the cutting head shown in FIG. 2.
Figure 4:
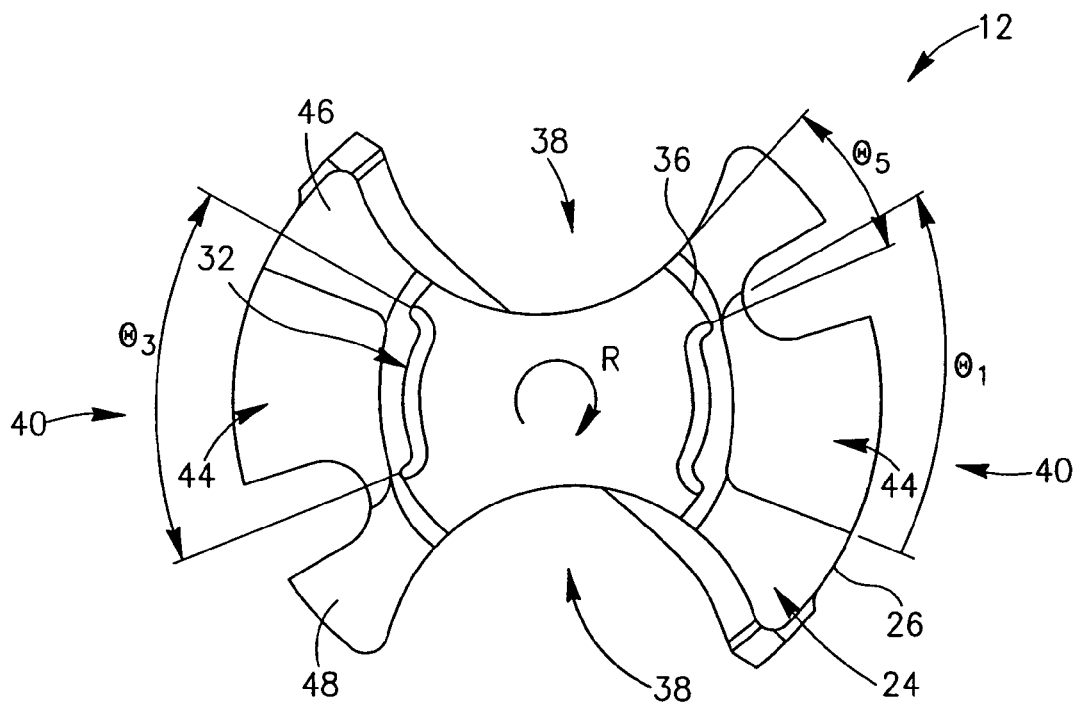
FIG. 4 is a bottom view of the cutting head shown in FIG. 2.

Two head flutes 38 extend generally axially rearwardly along a periphery of the cap portion 18 and fixation portion 20, forming two identical head segments 40 therebetween (FIG. 3). Each head segment 40 comprises a cutting edge 42 formed along an intersection of an adjacent rake surface 43 with the head surface 22. A cap recess 44 (FIG. 4) opening out to the peripheral side surface 26 and to the head base surface 24 divides the head base surface 24 into a first head base surface 46 at a leading end and a second head base surface 48 at a trailing end thereof. A head coolant channel 50 (FIG. 2) opens out to the head surface 22, peripheral side surface 26, and second head base surface 48 and intersects the cap recess 44. A head torque transmission wall 52 adjacent the first head base surface 46 extends along a portion of the cap recess 44 transverse to the head base surface 24 and generally faces opposite the direction of rotation R. A cap recess forward surface 54 adjacent the head torque transmission wall 52 is generally parallel to the head base surface 24.

Figure 5:
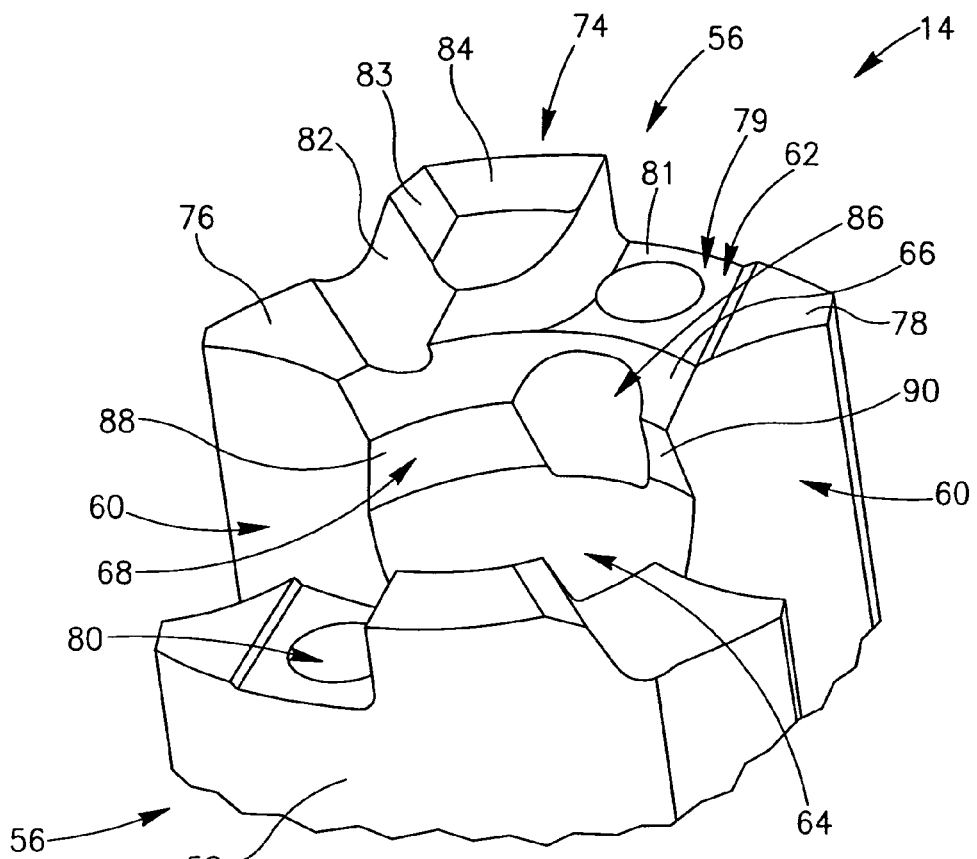
FIG. 5 is a perspective view of a forward end of a tool shank in accordance with the present invention.

The tool shank 14 (FIG. 5) comprises, at a forward end thereof, two diametrically disposed shank coupling portions 56 each peripherally bound by a shank peripheral surface 58 and two shank flutes 60. Each shank coupling portion 56 has a forwardly facing shank support surface 62 extending from the shank peripheral surface 58 generally transversely inwardly to a shank support recess 64 formed between the shank coupling portions 56.

Figure 8:
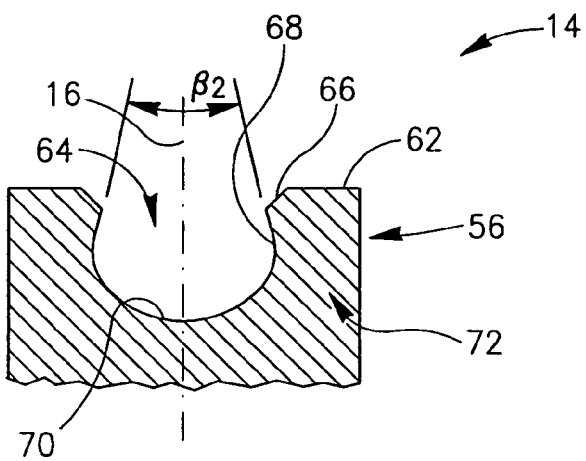
FIG. 8 is a partial cross sectional view of the tool shank taken along the line VIII-VIII in FIG. 6.

The shank support recess 64 (FIG. 8) is formed by a forward recess surface 66 extending inwardly and rearwardly from each shank support surface 62, a shank fixation surface 68 extending from each forward recess surface 66 axially rearwardly and radially outwardly at a second cone angle $\beta 2$, and a concave rear recess surface 70 extending between the shank fixation surfaces 68 of the shank coupling portions 56. The shape of the shank support recess 64 is such that a narrow neck region 72 is formed in each shank coupling portion 56 adjacent the join between the shank fixation surface 68 and the rear recess surface 70. The narrow neck region 72 makes the shank coupling portions 56 resiliently displaceable.

A protuberance 74 (FIG. 5) protrudes forwardly from each shank support surface 62 and a depression 79 having a forwardly facing depression face 81 is formed in each shank support surface 62 at a trailing end of the protuberance 74. The protuberance 74 and the depression 79 divide the shank support surface 62 into a first shank support surface 76 at a leading end and a second shank support surface 78 at a trailing end thereof. A shank coolant channel 80 opens out to the depression face 81 for communicating with the head coolant channel 50. A shank torque transmission wall 82 adjacent the first shank support surface 76 extends along a portion of the protuberance 74. The shank torque transmission wall 82 is transverse to the shank support surface 62 and generally faces the direction of rotation R. A protuberance forward surface 84 merges with the shank torque transmission wall 82 via a beveled surface 83, and is generally parallel to the shank support surface 62.

Figure 6:
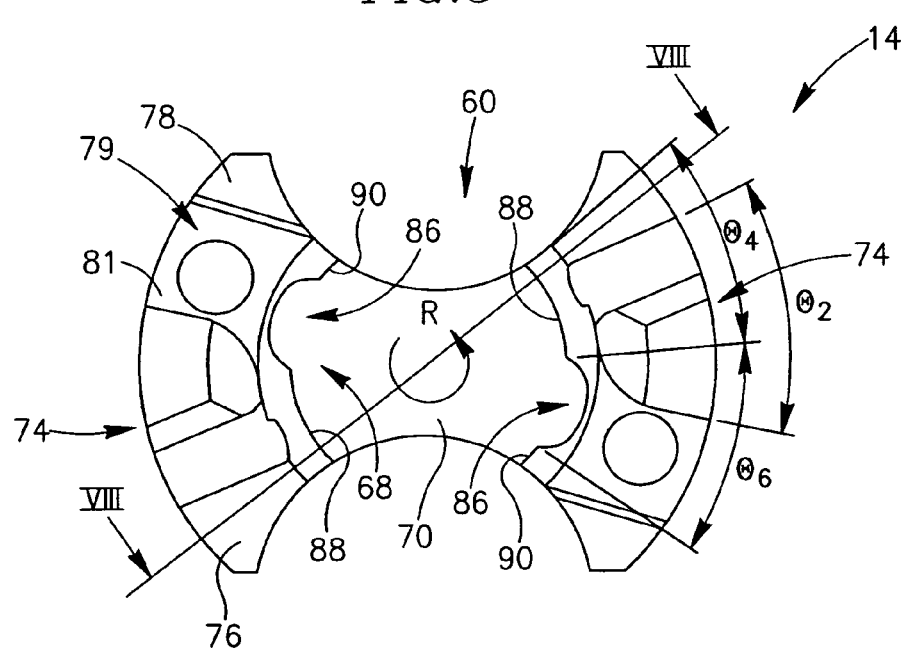
FIG. 6 is a top view of the tool shank shown in FIG. 5.

In planes perpendicular to the axis of rotation 16, an angular extension θ1 of the cap recess 44 (FIG. 4) is larger than an angular extension θ2 of the protuberance 74 (FIG. 6). A shank fixation recess 86 (FIG. 5) divides the shank fixation surface 68 into a first shank fixation surface 88 at a leading end and a second shank fixation surface 90 at a trailing end thereof. In planes (FIG. 4 for cutting head 12, and FIG. 6 for tool shank 14) perpendicular to the axis of rotation 16, an angular extension θ3 of the head fixation recess 32 is larger than an angular extension θ4 of the first shank fixation surface 88 and an angular extension θ5 of the second head fixation surface 36 is smaller than an angular extension θ6 of the shank fixation recess 86.

In order to mount the cutting head 12 on the tool shank 14, the cutting head 12 and tool shank 14 are axially aligned so that the head segments 40 and shank coupling portions 56 are arranged in opposing pairs, and so that for each pair, the cap recess 44, second head fixation surface 36, head fixation recess 32 and second head base surface 48 of the cutting head 12 are directly above the protuberance 74, shank fixation recess 86, first shank fixation surface 88 and depression 79 of the tool shank 14, respectively.

The cutting head 12 and tool shank 14 are then urged towards each other so that the protuberance 74 is inserted into the cap recess 44, the second head fixation surface 36 is inserted into the shank fixation recess 86, the first shank fixation surface 88 is inserted into the head fixation recess 32, and the second head base surface 48 and depression face 81 abut. Finally, the cutting head 12 is brought into a fully mounted position (FIG. 1) by rotating it relative to the tool shank 14 until the head and shank torque transmission walls 52, 82 abut.

It will be appreciated that an angular extension of each depression face 81 is larger than an angular extension of its associated second head base surface 48. As the cutting head 12 is rotated relative to the tool shank 14, the second head base surfaces 48 move out of the depressions 79 and onto the second shank support surfaces 78. This in turn causes the fixation portion 20 of the cutting head 12 to contact and displace the resilient shank coupling portions 56 in a generally radially outward direction and the head and shank fixation surfaces 28, 68 of each opposing pair to engage each other in an interlocking male-female fashion. In the fully mounted position the cutting head 12 is retained in a self clamping manner by the tool shank 14 in a dovetail, or bayonet fashion. If desired, the head and shank fixation surfaces 28, 68 can be forced to engage each other at forward portions thereof by making the first cone angle β1 smaller than the second cone angle β2.

In the fully mounted position, for each of the opposing pairs of head segments 40 and shank coupling portions 56, in addition to the abutment of the head and shank torque transmission walls 52, 82; the first head base surface 46 and first shank support surface 76 abut, the second head base surface 48 and second shank support surface 78 abut, and the first and second head fixation surfaces 34, 36 and the first and second shank fixation surfaces 88, 90; respectively abut each other to provide a self-clamping of the cutting head 12 on the tool shank 14.

Figure 9:
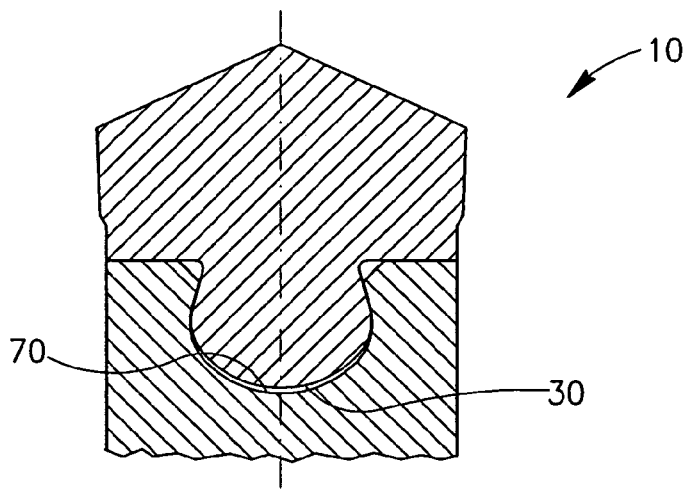
FIG. 9 is a longitudinal cross sectional view of the drill shown in FIG. 1, taken along a line similar to those of FIGS. 7 and 8.

It should be noted that in the fully mounted position, the rear fixation surface 30 and the rear recess surface 70 are not in abutment so that a space exists between them (FIG. 9). This space is preferably small so that chips cut from a workpiece will not become lodged in the space. It should also be noted that in the fully mounted position (FIG. 1), for each of the opposing pairs of head segments 40 and shank coupling portions 56, there is a gap between the protuberance forward surface 84 and the cap recess forward surface 54. Consequently, the cutting head 12 is axially supported by the tool shank 14 at four spaced apart axial support regions on the shank support surfaces 62, formed by the abutment of the first and second head base surfaces 46, 48 with the first and second shank support surfaces 76, 78; respectively, of each of the opposing pairs of head segments 40 and shank coupling portions 56. With four spaced apart axial support regions the cutting head 12 is stably coupled to the tool shank 14.

Each shank support surface 62 is preferably flat and the two shank support surfaces 76, 78 are preferably coplanar. Similarly, each head base surface 24 is preferably flat and the two head base surfaces 46, 48 are preferably coplanar. Flat and coplanar axial support surfaces are advantageous over non-coplanar axial support surfaces since it is easier to achieve the required tolerances for coplanar surfaces than it is for non-coplanar surfaces. Although the present invention has been described to a certain degree of particularity, it should be understood that various alterations and modifications could be made without departing from the scope of the invention as hereinafter claimed.

The invention claimed is:

1. A drill comprising:
   a cutting head releasably mounted on a forward end of a tool shank, having a common axis of rotation defining a direction of rotation, the cutting head comprising a cap portion and a fixation portion,
   the cap portion comprising a head surface, a head base surface and a peripheral side surface extending therebetween, the head base surface being transverse to the axis of rotation,
   the fixation portion protruding rearwardly from the head base surface away from the head surface and comprising a head fixation surface extending circumferentially relative to the axis of rotation;
   at least two head flutes extending along a periphery of the cap and fixation portions, and forming identical head segments between adjacent pairs of head flutes, each head segment comprising:
   a cap recess opening out to the peripheral side surface and the head base surface and dividing the head base surface into first and second head base surfaces no part of the cap recess acting as one of the first or second head base surfaces,
a head torque transmission wall extending along a portion of the cap recess transverse to the head base surface and generally facing opposite the direction of rotation,
a head fixation recess dividing the head fixation surface into first and second head fixation surfaces;
at least two shank flutes extending along a periphery of the tool shank and forming identical shank coupling portions between adjacent pairs of shank flutes, at the forward end of the tool shank, each shank coupling portion comprising:
a forwardly facing shank support surface,
a shank fixation surface located axially rearwardly relative to the shank support surface,
a shank fixation recess dividing the shank fixation surface into first and second shank fixation surfaces;
a protuberance protruding forwardly from each shank support surface and dividing the shank support surface into first and second shank support surfaces, and
a shank torque transmission wall extending along a portion of the protuberance transverse to the shank support surface and generally facing the direction of rotation;
wherein pairs of head segments and shank coupling portions are in mating relationship, and wherein for each such pair the first head base surface abuts the first shank support surface, the second head base surface abuts the second shank support surface, the head torque transmission wall abuts the shank torque transmission wall, the first head fixation surface abuts the first shank fixation surface and the second head fixation surface abuts the second shank fixation surface.

2. The drill according to claim 1, wherein the cap recess has a recess forward surface and the protuberance has a protuberance forward surface, and there is a gap between the recess forward surface and the protuberance forward surface.

3. The drill according to claim 2, wherein the recess forward surface is generally parallel to the head base surface and the protuberance forward surface is generally parallel to the shank support surface.

4. The drill according to claim 1, wherein the first and second shank support surfaces are flat.

5. The drill according to claim 1, wherein the first and second head base surfaces are flat.

6. The drill according to claim 1, wherein the first and second shank support surfaces are coplanar.

7. The drill according to claim 1, wherein the first and second head base surfaces are coplanar.

8. The drill according to claim 1, wherein the head fixation surface extends rearwardly away from the head base surface and outwardly away from the axis of rotation at a first cone angle $\beta 1$, and the shank fixation surface extends rearwardly away from the shank support surface and outwardly away from the axis of rotation at a second cone angle $\beta 2$.

9. The drill according to claim 8, wherein the first cone angle $\beta 1$ is smaller than the second cone angle $\beta 2$.

10. The drill according to claim 1, wherein the at least two head flutes and at least two shank flutes extend in a general axial direction.

11. The drill according to claim 10, wherein the at least two head flutes are identical and the at least two shank flutes are identical.

12. The drill according to claim 1, wherein the drill is provided with coolant channels.

13. The drill according to claim 1, wherein a depression is formed in each shank support surface at a trailing end of the protuberance.

14. A method for assembling a drill comprising the steps of:
providing a cutting head comprising a cap portion and a fixation portion, the cap portion comprising a head surface, a head base surface and a peripheral side surface extending therebetween, the head base surface being transverse to an axis of rotation, the fixation portion protruding rearwardly from the head base surface away from the head surface and comprising a head fixation surface extending circumferentially relative to the axis of rotation, at least two head flutes extending along a periphery of the cap and fixation portions, and forming identical head segments between adjacent pairs of head flutes, each head segment comprising a cap recess opening out to the peripheral side surface and the head base surface and dividing the head base surface into first and second head base surfaces no part of the cap recess acting as one of the first or second head base surfaces, a head torque transmission wall extending along a portion of the cap recess transverse to the head base surface and generally facing a counter direction of rotation, a head fixation recess dividing the head fixation surface into first and second head fixation surfaces,
providing a tool shank with at least two shank flutes extending along a periphery of the tool shank and forming identical shank coupling portions between adjacent pairs of shank flutes at the forward end of the tool shank, each shank coupling portion comprising a forwardly facing shank support surface and a shank fixation surface located axially rearwardly relative to the shank support surface, a shank fixation recess dividing the shank fixation surface into first and second shank fixation surfaces, a protuberance protruding forwardly from each shank support surface and dividing the shank support surface into first and second shank support surfaces, and a shank torque transmission wall extending along a portion of the protuberance transverse to the shank support surface and generally facing the direction of rotation;
axially aligning the cutting head and tool shank until pairs of head segments and shank coupling portions are opposite each other such that for each pair the first head fixation surface is above the shank fixation recess, the first head base surface is above the first shank support surface and the cap recess is above the protuberance;
for each pair, inserting the first head fixation surface into the shank fixation recess, and the protuberance into the cap recess; and
rotating the cutting head until, for each pair, the head torque transmission wall abuts the shank torque transmission wall.

15. A metal drill cutting head having an axis of rotation and a direction of rotation, and comprising:
a cap portion comprising a head surface, a head base surface, and a peripheral side surface extending between the head surface and the head base surface;
a fixation portion protruding rearwardly from the head base surface away from the head surface and comprising a head fixation surface; and at least two head flutes extending along the cutting head and forming a pair of head segments between adjacent pairs of head flutes, each head segment comprising:
   a cap recess opening out to the peripheral side surface and the head base surface, the cap recess dividing the head base surface into spaced apart first and second head base surfaces no part of the cap recess acting as one of the first or second head base surfaces, and
   a head torque transmission wall extending along a portion of the cap recess transverse to the head base surface, the head torque transmission wall generally facing opposite the direction of rotation.

16. The metal drill cutting head according to claim 15, further comprising a head fixation recess dividing the head fixation surface into first and second head fixation surfaces.

17. The metal drill cutting head according to claim 15, wherein the first and second head base surfaces are flat.

18. The metal drill cutting head according to claim 15, wherein the first and second head base surfaces are coplanar.

19. A metal drill having an axis of rotation and a direction of rotation, and comprising:
   a cutting head comprising:
      a cap portion comprising a head surface, a head base surface, and a peripheral side surface extending between the head surface and the head base surface;
      a fixation portion protruding rearwardly from the head base surface away from the head surface and comprising a head fixation surface; and
      at least two head flutes extending along the cutting head and forming a pair of head segments between adjacent pairs of head flutes, each head segment comprising:
         a cap recess opening out to the peripheral side surface and the head base surface, the cap recess dividing the head base surface into spaced apart first and second head base surfaces no part of the cap recess acting as one of the first or second head base surfaces, and
         a head torque transmission wall extending along a portion of the cap recess transverse to the head base surface, the head torque transmission wall generally facing opposite the direction of rotation; and
   a tool shank having a forward end portion, at least two shank flutes extending along a periphery of the forward end portion and forming a pair of shank coupling portions between adjacent pairs of shank flutes, each shank coupling portion comprising:
      a forwardly facing shank support surface;
      a protuberance protruding forwardly from each shank support surface and dividing the shank support surface into first and second shank support surfaces; and
      a shank torque transmission wall extending along a portion of the protuberance transverse to the shank support surface and generally facing the direction of rotation;

wherein:
   the cutting head is releasably mounted on the forward end of the tool shank with pairs of head segments and shank coupling portions in mating relationship, and
   for each such pair the first head base surface abuts the first shank support surface, the second head base surface abuts the second shank support surface, and the head torque transmission wall abuts the shank torque transmission wall.

20. The metal drill according to claim 19, further comprising:
   a head fixation recess dividing the head fixation surface into first and second head fixation surfaces;
   a shank fixation surface located axially rearwardly relative to the shank support surface; and
   a shank fixation recess dividing the shank fixation surface into first and second shank fixation surfaces, and
   wherein
   the first head fixation surface abuts the first shank fixation surface and the second head fixation surface abuts the second shank fixation surface.

21. The metal drill according to claim 19, wherein the cap recess has a recess forward surface and the protuberance has a protuberance forward surface, and there is a gap between the recess forward surface and the protuberance forward surface.

22. The metal drill according to claim 21, wherein the recess forward surface is generally parallel to the head base surface and the protuberance forward surface is generally parallel to the shank support surface.

23. The metal drill according to claim 19, wherein:
   the first and second shank support surfaces are flat and
   the first and second head base surfaces are flat.

24. The metal drill according to claim 19, wherein:
   the first and second shank support surfaces are coplanar; and the first and second head base surfaces are coplanar.

25. The metal drill according to claim 19, wherein the head fixation surface extends rearwardly away from the head base surface and outwardly away from the axis of rotation at a first cone angle $\beta 1$, and the shank fixation surface extends rearwardly away from the shank support surface and outwardly away from the axis of rotation at a second cone angle $\beta 2$.

26. The metal drill according to claim 25, wherein the first cone angle $\beta 1$ is smaller than the second cone angle $\beta 2$.

27. The metal drill according to claim 19, wherein:
   a depression is formed in each shank support surface at a trailing end of the protuberance.

28. The metal drill according to claim 27, wherein:
   the drill is provided with shank coolant channels which opens out to the depression.

* * * * *